(12) United States Patent
Homburg

(10) Patent No.: US 11,909,909 B2
(45) Date of Patent: Feb. 20, 2024

(54) METHOD FOR DETERMINING AN ORIGINATING TELEPHONE NUMBER

(71) Applicant: TELL-SEC AG, Glattfelden (CH)

(72) Inventor: Karl-Wilhelm Homburg, Berlin (DE)

(73) Assignee: TELL-SEC AG, Glattfelden (CH)

( * ) Notice: Subject to any disclaimer, the term of this patent is extended or adjusted under 35 U.S.C. 154(b) by 114 days.

(21) Appl. No.: 17/430,482

(22) PCT Filed: Apr. 9, 2021

(86) PCT No.: PCT/EP2021/059310
§ 371 (c)(1),
(2) Date: Aug. 12, 2021

(87) PCT Pub. No.: WO2021/205003
PCT Pub. Date: Oct. 14, 2021

(65) Prior Publication Data
US 2022/0311861 A1    Sep. 29, 2022

(30) Foreign Application Priority Data

Apr. 9, 2020  (EP) .................................... 20169014

(51) Int. Cl.
*H04M 3/42*     (2006.01)
*H04M 1/72463*  (2021.01)
*H04L 67/00*    (2022.01)

(52) U.S. Cl.
CPC ........ *H04M 3/42059* (2013.01); *H04L 67/34* (2013.01); *H04M 1/72463* (2021.01)

(58) Field of Classification Search
CPC .......... H04M 3/42059; H04M 1/72463; H04L 67/34

USPC .......................... 379/142.01, 142.04, 142.17
See application file for complete search history.

(56) References Cited

U.S. PATENT DOCUMENTS

| | | | | |
|---|---|---|---|---|
| 6,157,708 A | * | 12/2000 | Gordon ............. | H04M 3/42178 379/207.02 |
| 2002/0067814 A1 | * | 6/2002 | Brouns ................ | H04Q 3/0029 379/201.01 |
| 2010/0285834 A1 | * | 11/2010 | Hutchison, IV ........ | H04L 67/51 455/550.1 |
| 2014/0335822 A1 | | 11/2014 | Jain | |

(Continued)

FOREIGN PATENT DOCUMENTS

JP         2016018550 A    2/2016

OTHER PUBLICATIONS

European Patent Office, European Search Report in priority application EP20169014, dated Sep. 3, 2020, 8 pages.

(Continued)

*Primary Examiner* — Binh Kien Tieu
(74) *Attorney, Agent, or Firm* — Hooker & Habib, P.C.

(57) ABSTRACT

The invention comprises a method and a computer program for determining an originating telephone number of a telecommunications terminal and associating it with at least one data transmitted to a server in the course of an installation of application software on a telecommunications terminal or linked with a download of the application software or included in the downloaded application software. In the course of detecting the voice call setup request, no call setup is performed by the server.

17 Claims, 13 Drawing Sheets

(56) References Cited

U.S. PATENT DOCUMENTS

| | | | | |
|---|---|---|---|---|
| 2016/0072955 A1* | 3/2016 | Barkan | ................ | H04M 3/543 |
| | | | | 455/417 |
| 2018/0014168 A1* | 1/2018 | Lau | ....................... | H04M 7/006 |
| 2019/0019164 A1* | 1/2019 | Malley | ............... | G06Q 10/1095 |

OTHER PUBLICATIONS

European Patent Office, Machine translation into English of JP2016018550 generated Apr. 28, 2021, 2 pages.

European Patent Office, International Search Report issued in corresponding PCT/EP2021/059310, dated May 11, 2021, 15 pages.

DEEPL German-to-English Machine Translator (www.deeplake/translator), Machine Translation to English of European Patent Office search opinion in priority application EP20169014, dated Sep. 3, 2020, downloaded Oct. 30, 2023, 3 pages.

World Intellectual Property Organization, English language translation of European Patent Office, Written Opinion of the International Searching Authority in priority application PCT/EP2021/059310, dated May 11, 2021, 7 pages.

\* cited by examiner

METHOD FOR DETERMINING AN ORIGINATING TELEPHONE NUMBER

The present invention relates to the verification of the telephone number of a telecommunications terminal after a previous download of an application software, by determining the originating telephone number of the telecommunications terminal and associating it with at least one file.

BACKGROUND

Today's telecommunications terminals, such as smartphones, offer the possibility of installing and running a wide range of application software, such as apps, on these terminals. Such apps can be in contact with various services distributed in the computer networks. Examples of such services are software providers, online stores and social networks.

In the course of this, there is a need on the part of service providers for application software such as apps to know the user's cell telephone number and, ultimately, the identity of the user who, for example, downloads an app from a service provider's server to his or her mobile device. In this way, fraudulent activities related to the downloaded app, for example, can be made more difficult or detected.

Telecommunications terminals such as cell phones are not identified in the technical sense by their telephone number, but only by their SIM card number (known as IMSI) and their device number (known as IMEI). The telephone number given only from the user's point of view is associated with the cell phone only by the network operator. Thus, it is usually not possible for a service provider to infer the identity of a user via the IMSI or the IMEI.

For example, methods are known from the prior art to send a short message, for example an SMS (Short Message Service), after the installation of the app, to which the user needs to reply. However, this requires the SMS service to function properly and, in general, SMS messages to be transmitted almost instantaneously, which is not guaranteed in some regions of the world. In addition, charges are usually incurred when using the SMS service. This may be undesirable for a user, who is usually not willing to pay separate charges for such aforementioned methods in the course of an application software installation.

The problems referred to in the aforementioned prior art are solved by the method according to the claims.

SUMMARY

According to a first aspect, the invention relates to a method for determining, by a server, an originating telephone number of a telecommunications terminal and associating it with at least one data transmitted to the server in the course of an installation of application software on the telecommunications terminal or linked with a download of the application software or included in the downloaded application software, the method comprising:

Selecting a server telephone number for the purpose of the association to be performed from a set of several possible server telephone numbers;
Transmitting the server telephone number to the telecommunications terminal via data communication, but not by way of a call to the telecommunications terminal, wherein the transmission occurs in the course of the installation of the application software on the telecommunications terminal or with the download of the application software;
Detecting a voice call setup request directed from the telecommunications terminal to the server telephone number, wherein the originating telephone number is transmitted with the voice call setup request;
Associating the originating telephone number transmitted with the voice call setup request with the at least one data.

wherein, in the course of detecting the voice call setup requests, no setup of a call is performed by the server.

According to another aspect, the invention relates to a method for determining, by a server, an originating telephone number of a telecommunications terminal and associating it with at least one data transmitted to the server in the course of an installation of application software on the telecommunications terminal or linked with a download of the application software or included in the downloaded application software, the method comprising:

Selecting a first server telephone number for the purpose of the association to be performed from a set of several possible server telephone numbers;
Transmitting the first server telephone number to the telecommunications terminal via data communication, but not by way of a call to the telecommunications terminal, wherein the transmission occurs in the course of the installation of the application software on the telecommunications terminal or with the download of the application software;
Detecting a first voice call setup request directed from the telecommunications terminal to the server telephone number, wherein the originating telephone number is transmitted with the voice call setup request;
Selecting a second server telephone number for the purpose of the association to be performed from a set of several possible server telephone numbers;
Transmitting the second server telephone number to the telecommunications terminal via data communication, but not by way of a call to the telecommunications terminal, wherein the transmission occurs in the course of the installation of the application software on the telecommunications terminal or with the download of the application software;
Detecting a second voice call setup request directed from the telecommunications terminal to the second server telephone number, wherein the originating telephone number is transmitted with the second call setup request;
Verifying that the originating telephone numbers transmitted with the two voice call setup requests are identical;
If the verification is positive, associating the originating telephone number transmitted with the voice call setup request with the at least one data, wherein, in the course of detecting the voice call setup requests, no setup of a call is performed by the server.

Another aspect relates to a method for transmitting an originating telephone number of a telecommunications terminal to a server by the telecommunications terminal, the method comprising:

Receiving a server telephone number transmitted from a server;
Sending a voice call setup request directed to the server telephone number, wherein the originating telephone number is transmitted with the voice call setup request and wherein call number transmission is enabled.

Another aspect relates to a computer program product comprising instructions stored on a computer-readable storage medium for executing a method for determining an originating telephone number of a telecommunications terminal when the computer program is executed on a telecommunications terminal, comprising:

Reading a server telephone number transmitted from a server;

Sending a voice call setup request directed to the server telephone number, wherein the originating telephone number is transmitted with the voice call setup request and wherein call number transmission is enabled.

BRIEF DESCRIPTION OF THE DRAWINGS

In the following, embodiments are explained in more detail with reference to the drawings.

DETAILED DESCRIPTION

Figure 1:
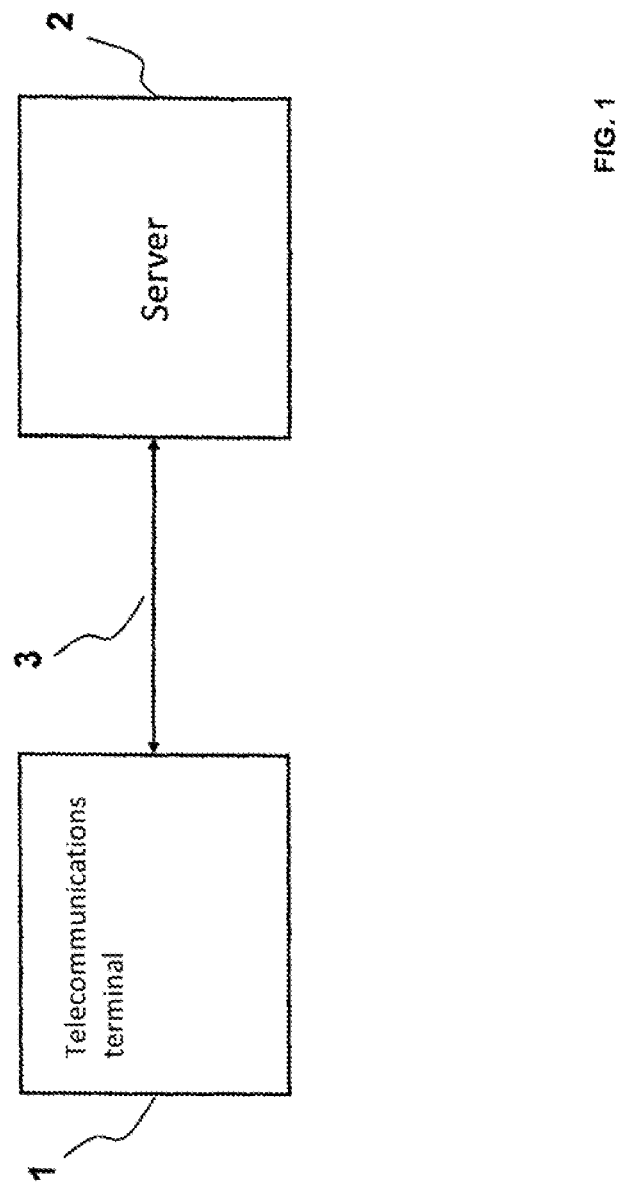
FIG. 1 shows a schematic diagram of the relationship between a telecommunications terminal and a server.

FIG. 1 is a schematic illustration of a relationship between a telecommunications terminal 1 and a server 2. Data communication between the telecommunications terminal 1 and the server 2 is comprised via a communication interface 3. In embodiments according to the invention, the telecommunications terminal 1 may comprise mobile devices such as smartphones, tablet PCs, notebooks, etc., and the server 2 may comprise one or more mainframes connected to each other, but may also comprise any other computer such as a personal computer. The communication interface 3 may comprise wired or wireless local area network (LAN) or wired or wireless metropolitan area networks (MAN) or wired or wireless wide area networks (WAN). In addition, the telecommunications terminal 1 can communicate with the server 2 via the public telephone network (fixed network and/or mobile network).

Figure 2:
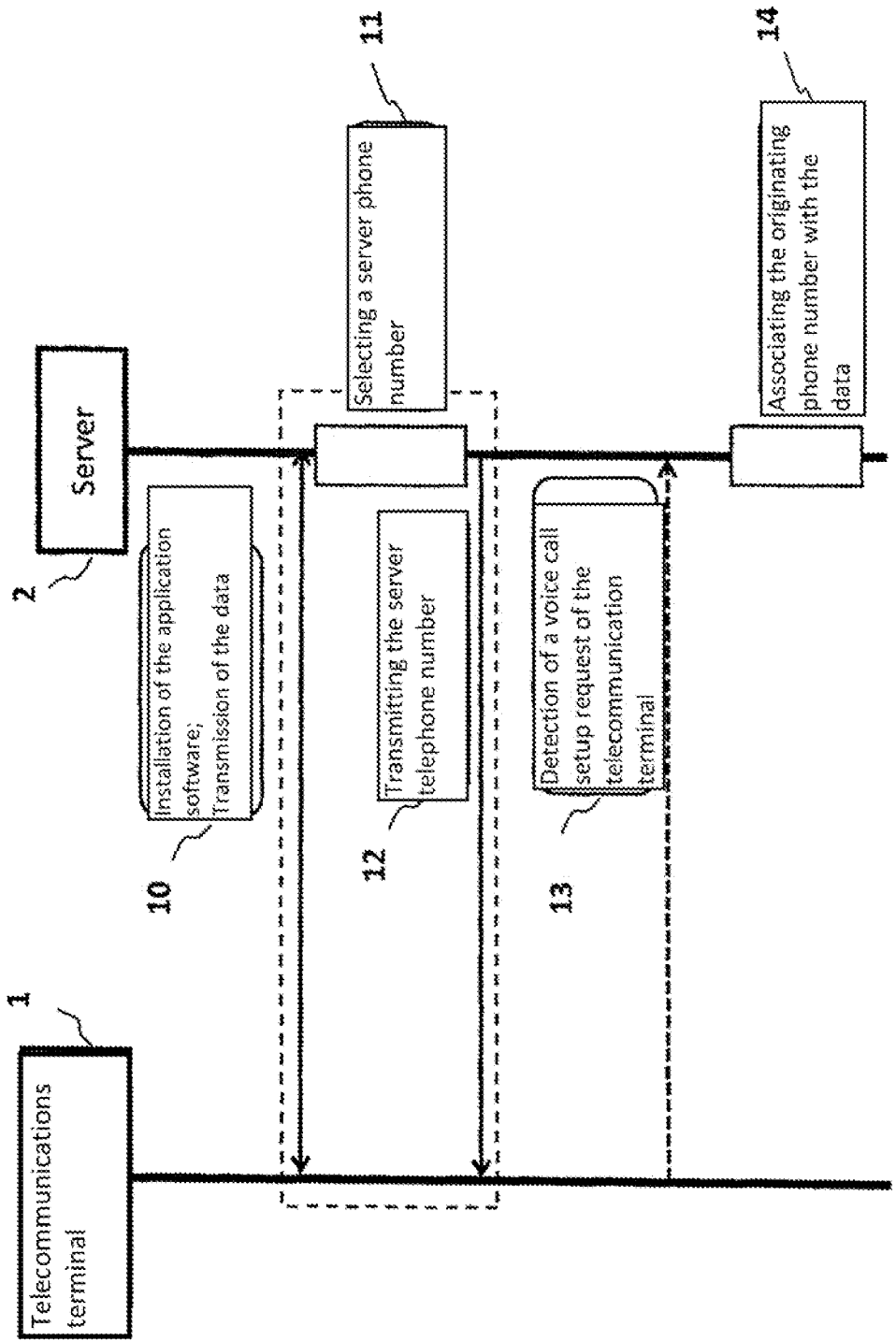
FIG. 2 shows an example of a sequence diagram from the server's perspective.

FIG. 2 shows a sequence diagram for determining an originating telephone number of a telecommunications terminal and associating it with at least one data from the perspective of server 2. A data is transmitted to the server 2 in an activity 10 in the course of an installation of application software on the telecommunications terminal 1. The transmitted data may comprise, for example, the International Mobile Station Equipment Identity (IMEI) of the telecommunications terminal 2 or the International Mobile Subscriber Identity (IMSI) stored on the SIM card of a telecommunications terminal 2, provided that the number in question is known to the server 2. The data may also be linked with a download of the application software or included in the downloaded application software. For example, the data may comprise a sequential number that is generated during a respective download of the application software or that is assigned to a running copy of the application software.

The transmission of the data can be done automatically, i.e. no actions to be performed are expected from the user who installs application software on a telecommunications terminal.

User interaction may be comprised within the scope of the installation of the application software by the user. The user who installs the application software on his smartphone, for example, is sent a link in the course of the installation process which, if clicked, leads to a website of the provider of the application software (e.g. Google Store) where the user is prompted to enter, for example, his name or the telephone number of his telecommunications terminal.

In an activity 11, the server 2 selects, in the course of the installation of the application software (activity 10), a server telephone number for the purpose of the to be performed association of the originating telephone number with the at least one data from a set of several possible server telephone numbers. For example, the set may consist of a fixed number of fixed telephone numbers associated with the server 2. When creating individual telephone numbers for the set, for example, it is possible to proceed analogously to the creation of telephone numbers for larger organizations, which consist of a plurality of organizational units. For example, the number sequence "01234" can be assigned for the server itself, which is then seen as analogous to the organization itself, and then, for example, a number analogous to an organizational unit. The latter number can be taken from an ascending number sequence starting at "0000" and ending at "9999".

In an activity 12, the server telephone number is transmitted to the telecommunications terminal 1 via data communication. However, the transmission does not take place by way of a call to the telecommunications terminal 1, rather the transmission takes place in the course of the installation of the application software on the telecommunications terminal 1 or takes place with the download of the application software. For example, a link to the page of the provider (e.g., Google Store) of the application software may be transmitted to the user on the telecommunications terminal 1. If the user then clicks on this link on his telecommunications terminal 1, the server telephone number is transmitted to the telecommunications terminal 1.

In an activity 13, the server 2 detects a voice call setup request directed to the server telephone number from the telecommunications terminal 1 over the public telephone network, wherein the originating telephone number is transmitted with the voice call setup request.

In the embodiments described and illustrated in the figures, the telecommunications terminal 1 may execute the voice call setup request to the server without requiring any input to the telecommunications terminal 1 from the user of the telecommunications terminal 1. Thus, the voice call setup request happens automatically without the user's participation.

In an activity 14, the server 2 associates the originating telephone number transmitted with the voice call setup request with the at least one data, for example, the International Mobile Station Equipment Identity (IMEI) of the telecommunications terminal 1 or the International Mobile Subscriber Identity (IMSI) stored on the SIM card of a telecommunications terminal 1. The association can also be made, for example, with the sequential number that is generated during a respective download of the application software or that is assigned for a running copy of the application software.

Figure 3:
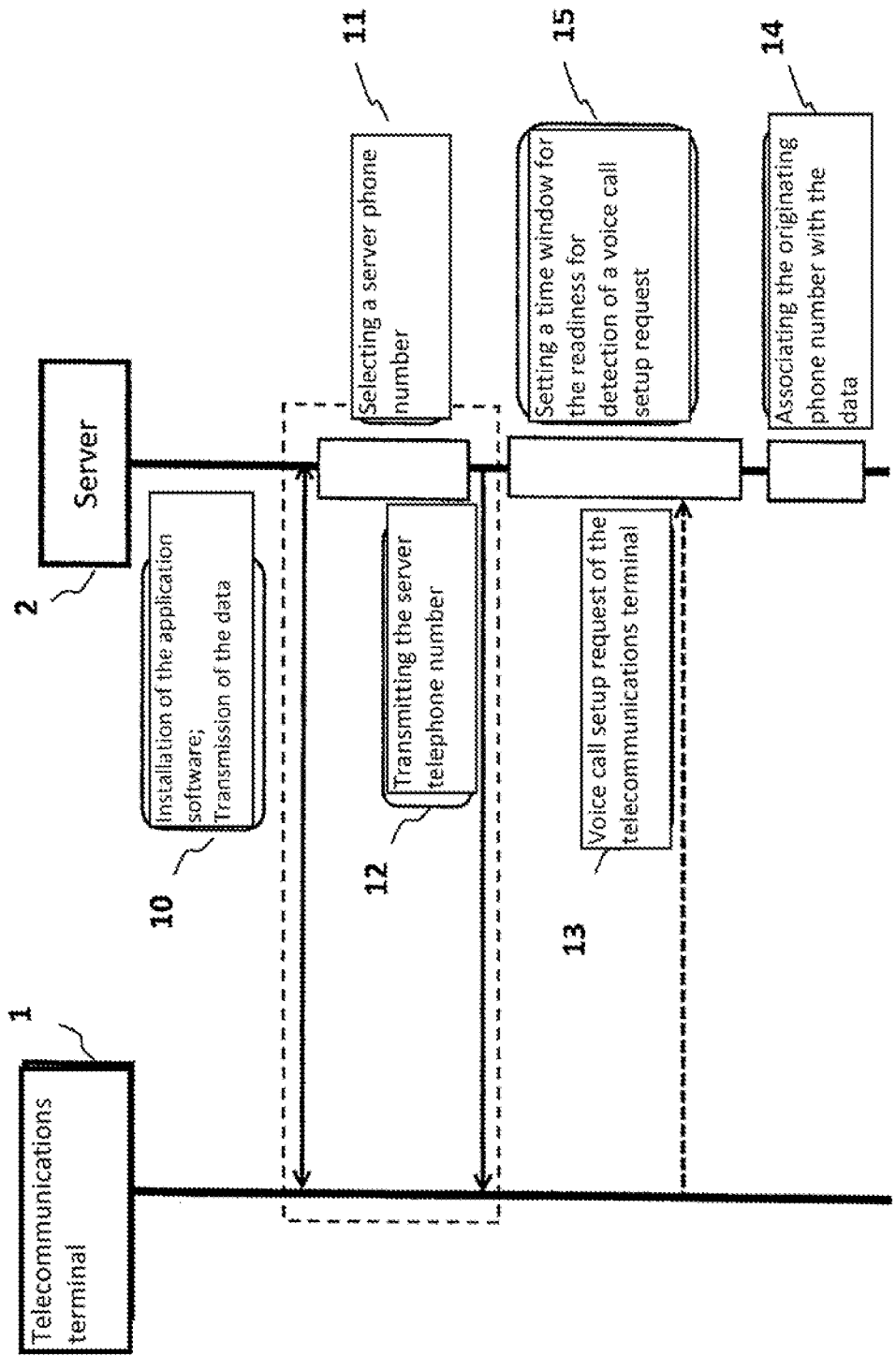
FIG. 3 shows in a sequence diagram a further development of the example of FIG. 2, which comprises setting a time window at the server within which the server side readiness for detection of a voice call setup request exists.

FIG. 3 is a sequence diagram of a further development of the embodiment of FIG. 2 again from the perspective of server 2, wherein the method further comprises, in an activity 15, setting a time window by server 2 after transmitting the server telephone number to the telecommunications terminal 1 within which server 2 is ready for detecting the voice call setup request directed by the telecommunications terminal 1 to the server telephone number. Setting the time window here comprises setting a time from which the time window starts to run and setting a duration for running the time window, or an end time.

Setting a time window by the server 2 ensures largely that the data is associated with the correct originating telephone number, i.e. the originating telephone number of the telecommunications terminal 2 that requested the installation of the application software.

The duration to be set for the time window may result from the analysis of time periods that have occurred in the past between the transmission of the server telephone numbers and the subsequent call setup requests from the telecommunications terminals 1. These time periods usually result in a Gaussian distribution with an expected value and variance for the time periods. Thus, the duration to be set can then be the mean of the Gaussian distribution, to which a multiple of the standard deviation is added.

The formula for the Gaussian distribution for the aforementioned periods is given by:

$$f(\Delta t \mid \Delta t_m, \sigma) = \frac{1}{\sqrt{2\pi\sigma^2}} e^{\frac{-(\Delta t - \Delta t_m)^2}{2\sigma^2}}$$

wherein $\Delta t_m$ refers to the expected value for the periods and $\sigma^2$ refers to the variance and $\sigma$ refers to the standard deviation:

According to the aforementioned definition, the duration is then given by:

Duration=$\Delta t_m \cdot (fac \cdot \sigma)$ wherein fac can be any factor by which the standard deviation can be multiplied.

The starting point for the time window can be advantageously selected, for example, the starting point can be selected as the time at which in the activity 12 the transmission of the server telephone number to the telecommunications terminal 1 by the server 2 takes place.

Figure 4:
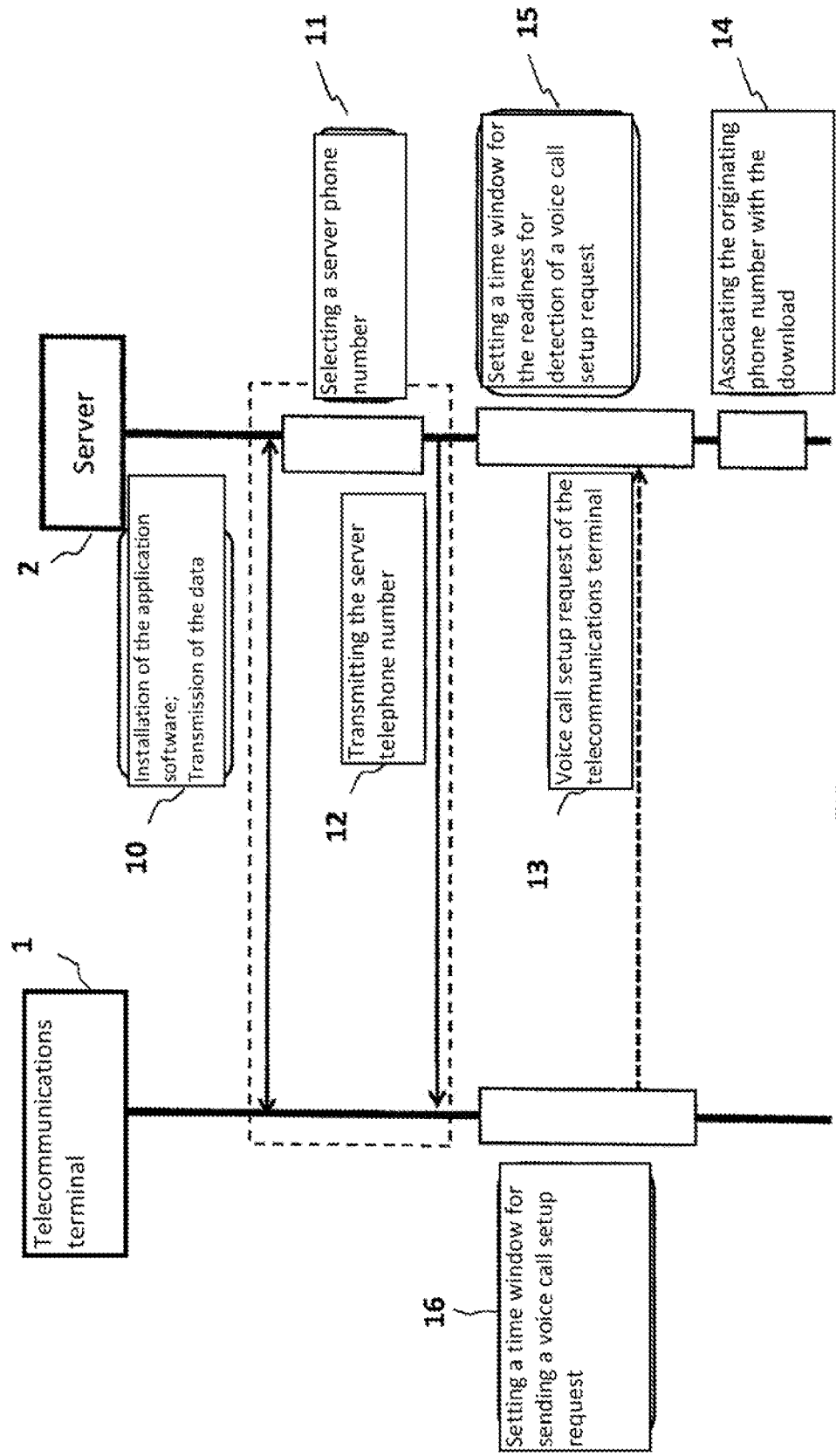
FIG. 4 shows in a sequence diagram a further development of the example of FIG. 3, which comprises setting the time window at the telecommunications terminal within which the voice call setup request is sent to the server.

FIG. 4 is a further development of the embodiment of FIG. 3. In addition to the aforementioned setting of the time window by server 2, the method shown in FIG. 4 additionally comprises, in an activity 16, the setting of the time window at telecommunications terminal 1, wherein the transmission of the corresponding time and duration for the time window takes place in the course of the installation of the application software on the telecommunications terminal or with the download of the application software. In this embodiment, the time window not only determines the starting point and duration for the readiness of server 2 to detect the voice call setup request, but the starting point and duration also determine for telecommunications terminal 1 a time window in which to perform a voice call setup request.

Advantageously, the starting point for the time window at the telecommunications terminal 1 should correspond to the starting point for the time window at server 2. Thus, if the time of transmission of the server telephone number by server 2 to telecommunications terminal 1 is selected as the starting point for the time window at server 2, as explained above, the time of reception of the server telephone number is selected as the starting point for the time window at telecommunications terminal 1, which usually differs only insignificantly from the time of transmission of the server telephone number.

The server telephone number transmitted in activity 12 can be re-assigned so that it is available again after the completion of performing a method. In this regard, the method may comprise either enabling the server to reselect the server telephone number after the time window has expired, regardless of whether the transmitted originating telephone number has been associated with the at least one data, or enabling the server to reselect the server telephone number after the transmitted originating telephone number has been associated with the at least one data, regardless of whether the time window has already expired.

Figure 5:
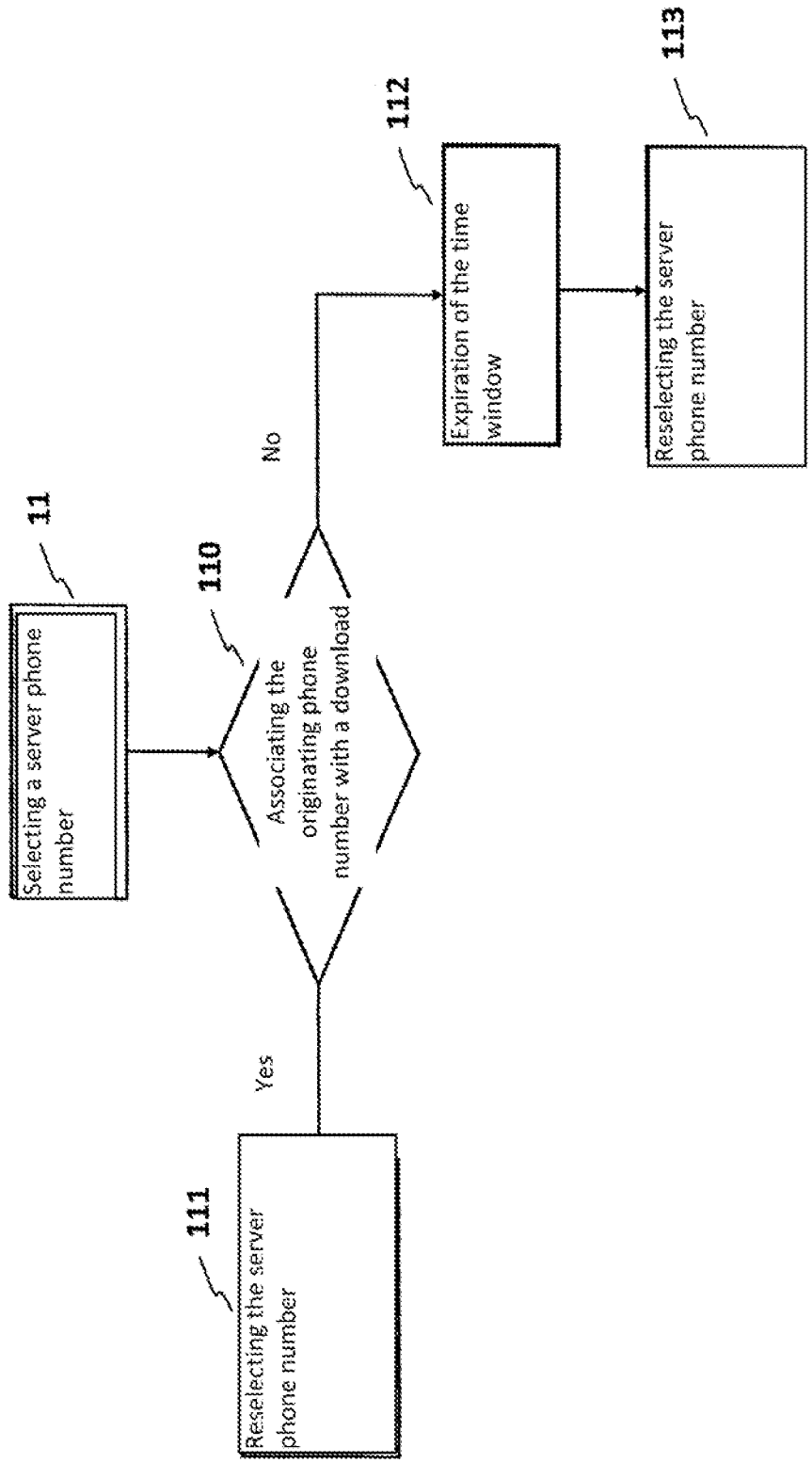
FIG. 5 shows a flowchart for re-selecting the server telephone number.

FIG. 5 is a flowchart illustrating according to which possible situations re-selection of the server telephone number already selected in activity may occur. If an association of the originating telephone number with the data could be made in the course of the method according to the invention (answering "yes" to query 110 in FIG. 5), the server telephone number selected in activity 11 has served its purpose, is thus freely available again and can be selected again in an activity 111. If, on the other hand, it was not possible to associate the originating telephone number with the data (answering "no" to query 110 in FIG. 5), the server telephone number is also free again after the time window 112 has expired and can also be selected again in an activity 113.

In case of non-detection of the voice call setup request directed to the server telephone number, the execution of the method can be repeated (without repeating the installation of the application software or the download of the application software).

Figure 6:
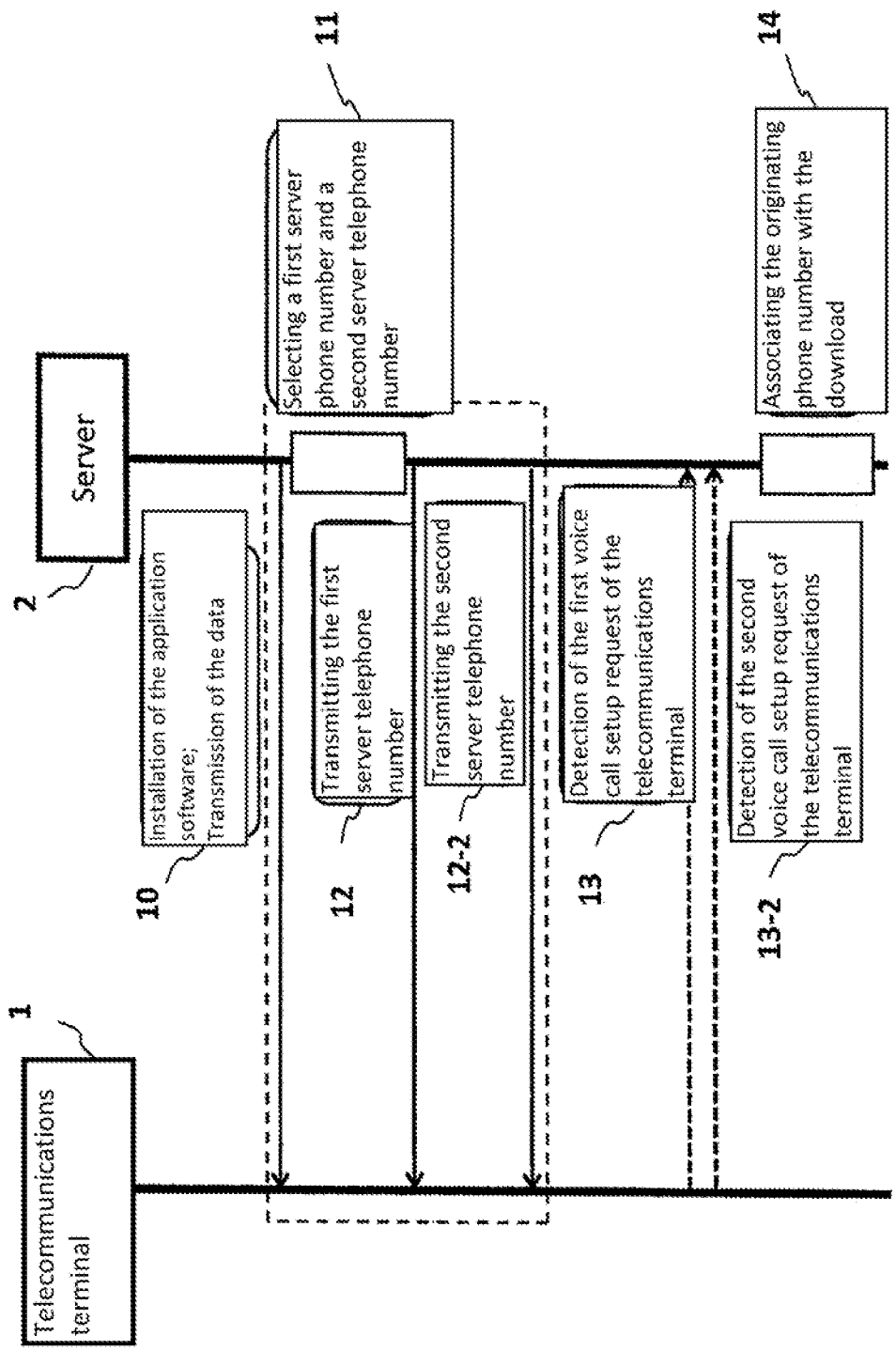
FIG. 6 shows an embodiment based on a sequence diagram that is a further development of the example of FIG. 2 with a second server telephone number.

In order to make the association of the data with the originating telephone number more secure against accidental mis-associations or tampering attempts, a second server telephone number is transmitted in the embodiment of FIG. 6. In this embodiment, the method comprises, in activities 11 and 12-2, selecting a second server telephone number for the purpose of the association to be performed from a set of a plurality of possible server telephone numbers, and transmitting the second server telephone number to the telecommunications terminal 1 via data communication, but not by way of a call to the telecommunications terminal 1, wherein transmitting is performed in the course of the installation of the application software on the telecommunications terminal or with the download of the application software. The method further comprises detecting a voice call setup request directed by the telecommunications terminal 1 to the second server telephone number, wherein the originating telephone number is transmitted with the voice call setup request, and associating the originating telephone number transmitted with the voice call setup request with the at least one data.

The sequence diagram of this embodiment according to FIG. 6 shows additional activities with respect to selecting and transmitting a second server telephone number compared to FIG. 3. Additional embodiments made above in connection with FIGS. 1-5, and in particular with FIG. 3, also apply to the embodiment of FIG. 6.

The second server telephone number is different from the first server telephone number. In activity 11, the second server telephone number is selected in addition to the first server telephone number. Analogous to the (first) server telephone number, the second server telephone number can be selected from a set of several possible server telephone numbers. This set can also consist of a fixed number of fixed telephone numbers, which are associated with the server 2. When creating the individual telephone numbers for the set, it is possible, as in the case of the (first) server telephone number, to proceed analogously to the creation of telephone numbers for larger organizations, which consist of a plurality of organizational units. For example, the number sequence "01234" can be assigned for the server itself, which is then seen as analogous to the organization itself, and then, for example, a number analogous to an organizational unit. The latter number can be taken from an ascending number sequence starting at "0000" and ending at "9999".

At 12 and 12-2, the first and second server telephone numbers, respectively, are transmitted to the telecommunications terminal 1 via data communication. As illustrated in FIG. 3, the transmission does not take place by way of a call to the telecommunications terminal 1, rather the transmission takes place in the course of the installation of the application software on the telecommunications terminal 1 or takes place with the download of the application software.

At 13 and 13-2, the server 2 detects two voice call setup requests directed from the telecommunications terminal 1 via the public telephone network to the first and second server telephone numbers, respectively, wherein the originating telephone number is transmitted with the first and second voice call setup requests, respectively.

At 14, server 2 verifies whether there is consistency with respect to the two originating telephone numbers, i.e., whether the originating telephone numbers transmitted with the two voice call setup requests are identical. If this consistency check is positive, the server 2 associates the originating telephone number transmitted with the two voice call setup requests with the at least one data, for example, the International Mobile Station Equipment Identity (IMEI) of the telecommunications terminal 1 or the International Mobile Subscriber Identity (IMSI) stored on the SIM card of a telecommunications terminal 1. The association can also be made, for example, with the sequential number that is generated during a respective download of the application software or that is assigned for a running copy of the application software.

One design of this embodiment may also comprise setting a time window when transmitting two server telephone numbers. The method according to the invention, in this embodiment, comprises setting one or two time windows by the server.

Other explanations made above in connection with FIGS. 1-6 also apply to this embodiment with two server telephone numbers and time slot(s) to be called.

In one variation, a common time window is set after transmitting the two server telephone numbers to the telecommunications terminal 1 within which the server is ready for detecting the voice call setup requests sent by the telecommunications terminal 1 to the two server telephone numbers, and wherein setting the time window comprises setting a time from which the time window starts to run and setting a duration for the time window to run, or setting an end time.

In another variant, two separate time windows are set after the respective server telephone number has been transmitted to the telecommunications terminal 1, within which the server is ready for detecting the voice call setup request directed by the telecommunications terminal 1 to the first and second server telephone number, respectively, and wherein setting the respective time window comprises setting a time from which the respective time window starts to run and setting a duration for running the respective time window, or setting an end time for the respective time window.

Figure 7:
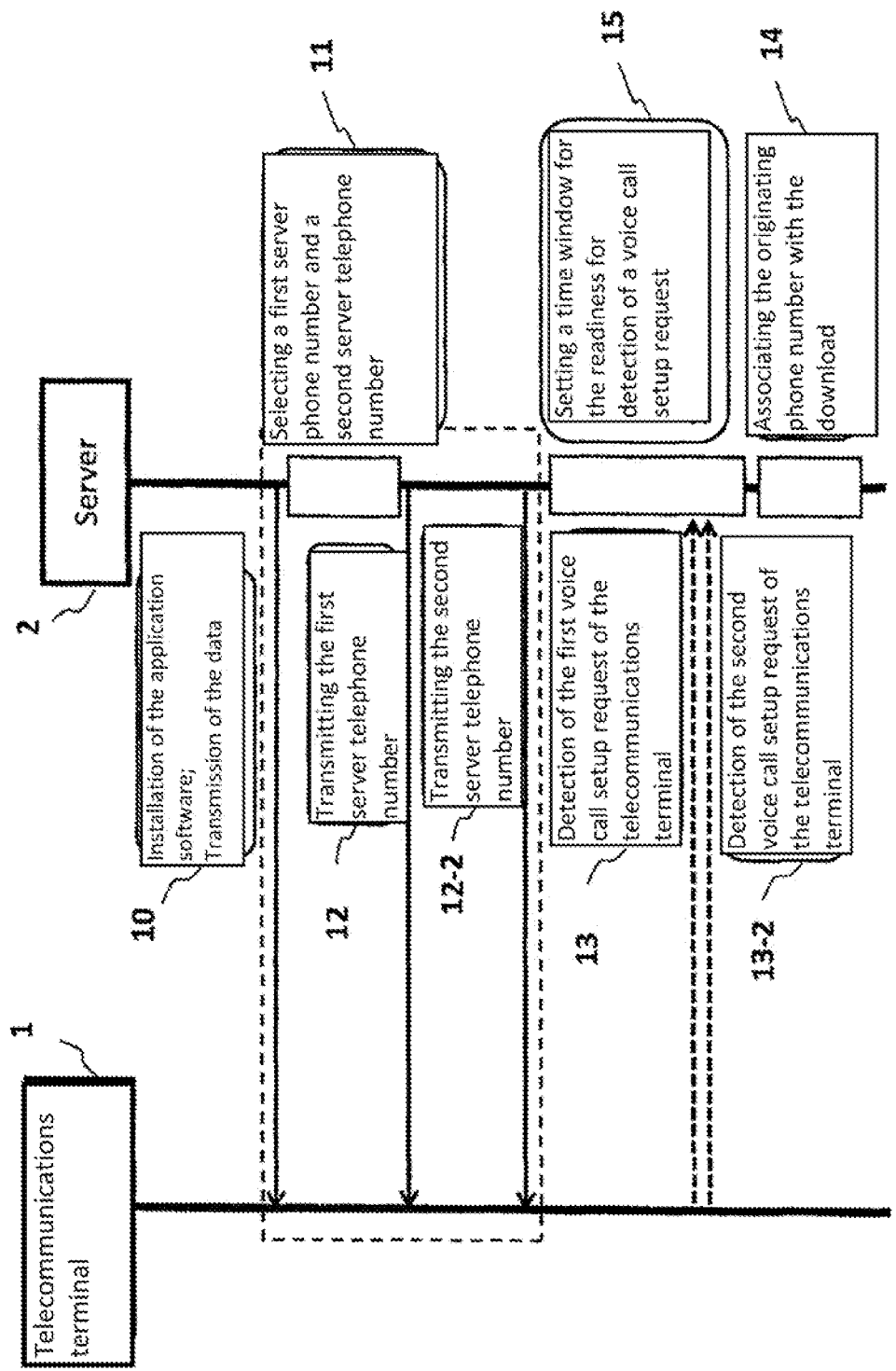
FIG. 7 shows a sequence diagram of a further development of the embodiment of FIG. 6 with a second server telephone number, comprising setting a time window at the server within which the server side is ready to detect a voice call setup request, similar to the example of FIG. 3.

The sequence diagram of FIG. 7 illustrates the variant with a common time window. Setting the time window is done in 15. Similar to the aforementioned embodiment, the duration of the time window can be determined from a Gaussian distribution over those time periods that have occurred in the past between the transmission of the server telephone numbers and the subsequent call setup requests on the part of telecommunications terminals 1.

Setting the starting point for the time window can be done, for example, after transmitting the second server telephone number in activity 12-2 of FIG. 7.

The start point and duration for the time slot, or the end point, may be transmitted when the two server telephone numbers are transmitted to the telecommunications terminal 1. The embodiment here additionally comprises setting a time window by the server after transmitting the server telephone number or the second server telephone number to the telecommunications terminal 1, within which the server is ready for detecting the voice call setup request directed by the telecommunications terminal 1 to the server telephone number and to the second server telephone number, and wherein setting the time window comprises setting a point in time from which the time window starts to run and setting a duration for the running of the time window, and transmitting the time and the duration to the telecommunications terminal, wherein transmitting the time and the duration is done in the course of the application software installation on the telecommunications terminal 1 or with the download of the application software.

Figure 8:
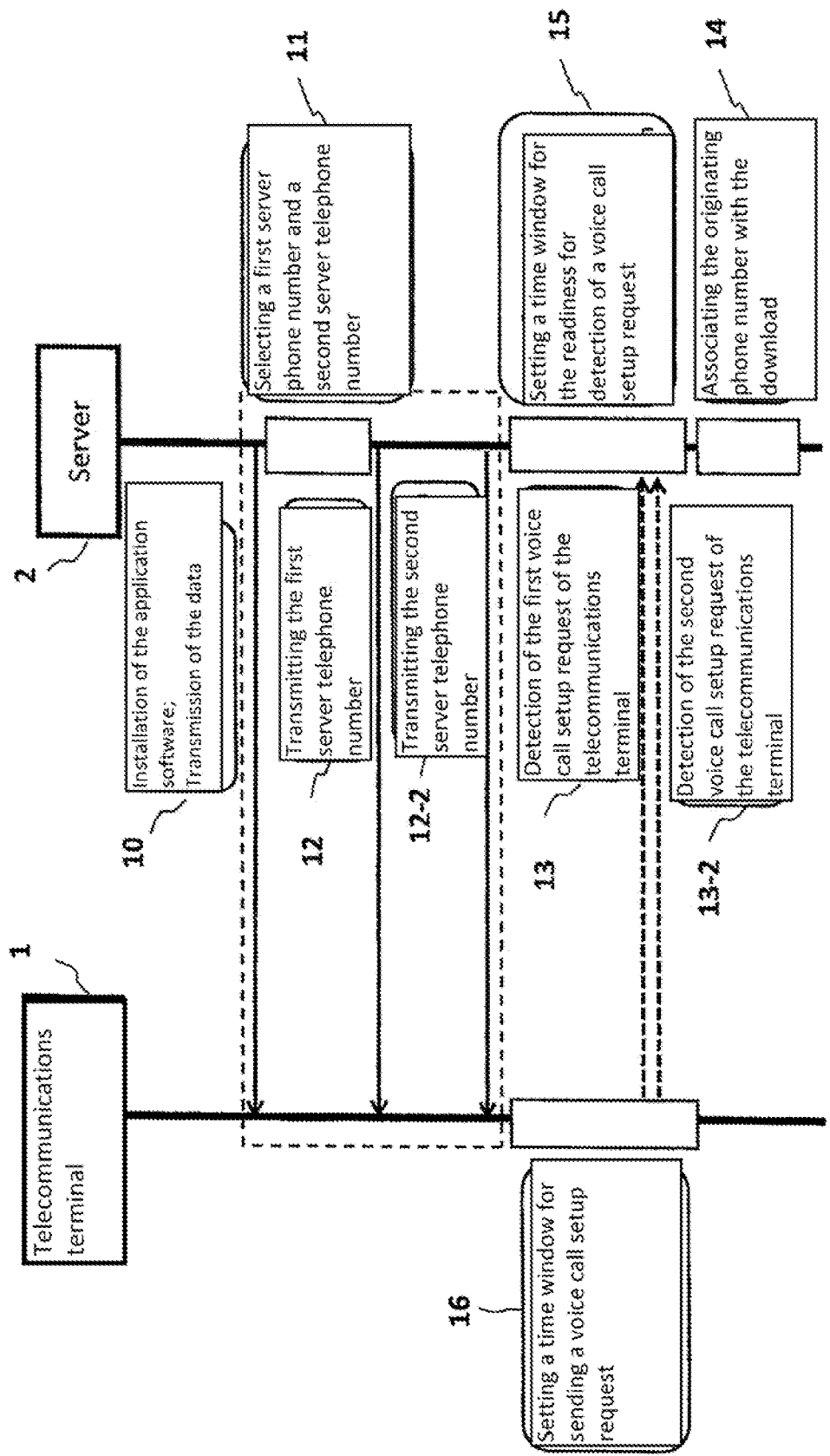
FIG. 8 shows a sequence diagram of a further development of the embodiment of FIG. 7 with a second server telephone number, comprising the setting of the time window at the telecommunications terminal within which the voice call setup request is sent to the server, similar to the example of FIG. 4.

FIG. 8 shows a corresponding sequence diagram, in which one or two time windows in the telecommunications terminal 1 also provide for timely sending of the voice call setup requests. Analogous to embodiments in which only one server telephone number is transmitted to the telecommunications terminal 1, in activity 16 the time window is set at the telecommunications terminal 1, wherein the transmission of the time and duration for the time window occurs in the course of the installation of the application software on the telecommunications terminal 1 or with the download of the application software. Thus, in this embodiment, the time window not only determines the starting point and duration for the readiness of the servers 2 to detect the voice call setup request to the (first) server telephone number and the second server telephone number, but the starting point and duration also determine a time window for the telecommunications terminal 1 to perform a voice call setup request to the first server telephone number and the second server telephone number.

Advantageously, the starting point for the time window at the telecommunications terminal 1 also corresponds to the starting point for the time window at the server 2 in this embodiment. Thus, if the time of transmission of the second server telephone number by the server 2 to the telecommunications terminal 1 is selected as the starting point for the time window at the server, as explained above, the time of reception of the second server telephone number is selected as the starting point for the time window at the telecommunications terminal 1, which usually differs only insignificantly from the time of transmission of the second server telephone number.

Also in the case of the telecommunications terminal 1, in one variant a common time window is set for sending the two voice call setup requests, whereas in another variant two separate time windows are set for the respective voice call setup requests.

In another embodiment of the method, the second server telephone number may also be re-selected in a manner analogous to the first server telephone number so as to be available again after completion of the method according to the invention. In this embodiment, the method further comprises allowing the server to reselect the first server telephone number and the second server telephone number after the time window has expired, regardless of whether the transmitted originating telephone number has been associated with the at least one data, or allowing the server to reselect the first server telephone number and the second server telephone number after the transmitted originating telephone number has been associated with the at least one data, regardless of whether the time window has already expired.

Figure 9:
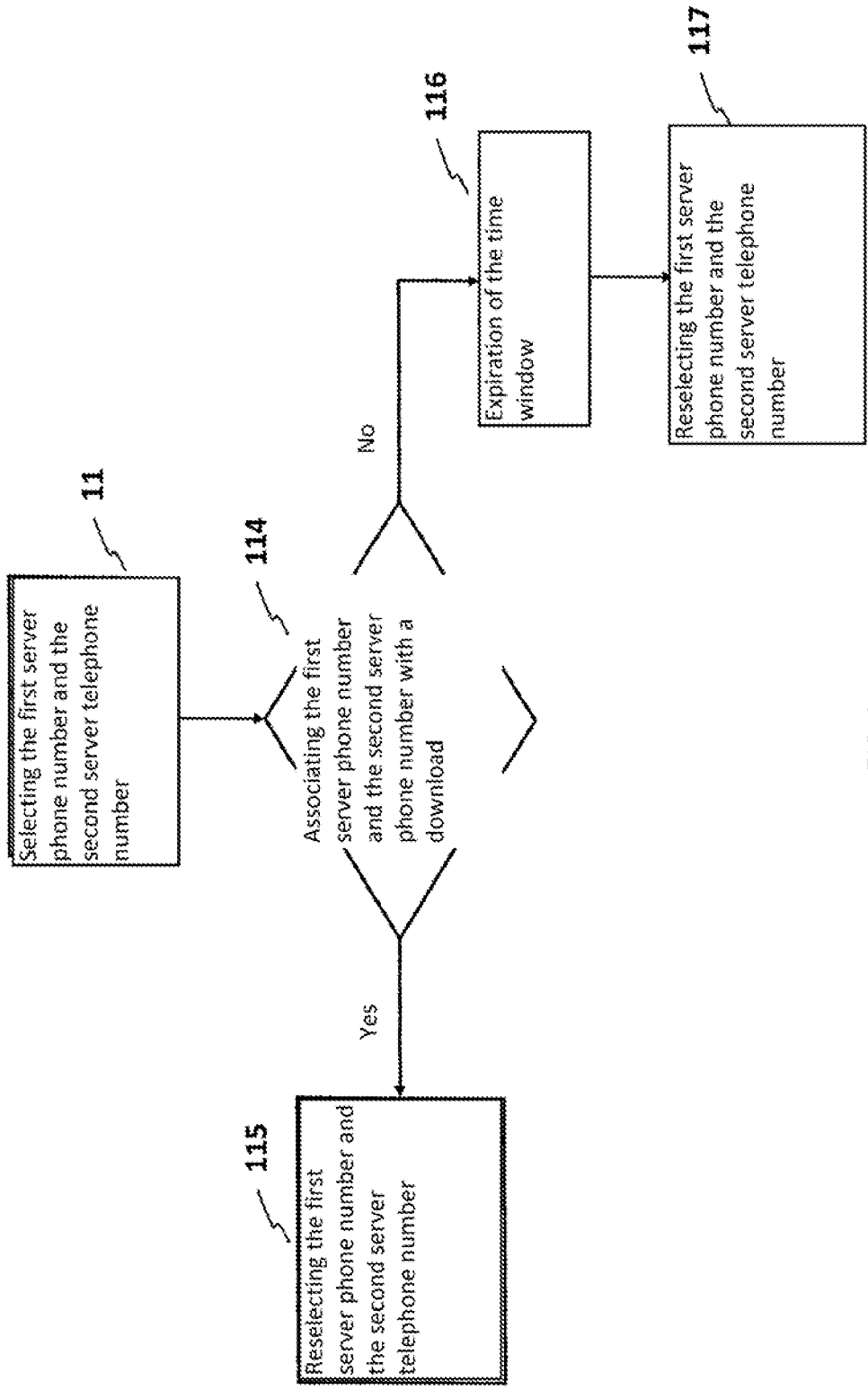
FIG. 9 shows, in one embodiment, a flowchart for re-selecting the server telephone number and a second server telephone number.

FIG. 9 shows in a flowchart, following which possible situations in the method, a re-selection of the (first) server telephone number and second server telephone number already selected in the activity may occur. If an association of the originating telephone number with the data could be made in the course of the method according to the invention (answering "yes" to query 114 in FIG. 5), the first server telephone number and the second server telephone number selected in activity 11 have fulfilled their purpose, are thus freely available again and can be selected again in an activity 115. If, on the other hand, it was not possible to associate the originating telephone number with the data (answering "no" to query 114 in FIG. 5), the first server telephone number and the second server telephone number are also free again after the time window 116 has expired and can also be selected again in an activity 117.

Analogously to embodiments wherein only a (first) server telephone number is transmitted, in another embodiment of the method according to the invention, the method is repeated in case of non-detection of the voice call setup requests directed to the (first) server telephone number and to the second server telephone number, wherein the installation of the application software or the download of the application software is not repeated.

In other embodiments, the method according to the invention may further comprise setting the time window as shown in activity 16 in FIGS. 4 and 8, additionally comprising setting an additional duration within which the telecommunications terminal 1 does not send a new voice call setup request to the server telephone number and/or the second server telephone number after the time window has expired. This can, for example, give the server 2 time to initiate the repetition or initial execution of one of the methods according to the invention, for example in the event of a failed association of the originating telephone number with the data.

To transmit the originating telephone number with a voice call setup request, it is generally not necessary to comply with the setup request and actually set up the voice call. Instead, the originating telephone number is already transmitted to the server when the setup request is forwarded. Therefore, no call setup takes place. Thus, the method according to the invention comprises a non-establishment of the call by server 2 in the course of detecting the voice call establishment request(s), as shown in activity 12 in FIGS. 2, 3, 4, 6, 7, and 8. This allows for the user who wishes to install application software on their telecommunications terminal 1 to not incur connection fees in the course of the method.

In another embodiment, installing the application software or downloading the application software by the telecommunications terminal 1 comprises a data communication dialog with server 2, wherein the telecommunications terminal 1 communicates a user identification to server 2, wherein the user identification is comprised by the at least one data, and wherein associating the originating telephone number with the at least one data comprises verifying the user identification. This allows additional steps to be taken to verify the user's identity, in addition to associating the originating telephone number with the data.

The aforementioned methods may be entirely automated, so that no interaction of the user with the telecommunications terminal 1 is required at any stage.

Figure 10:
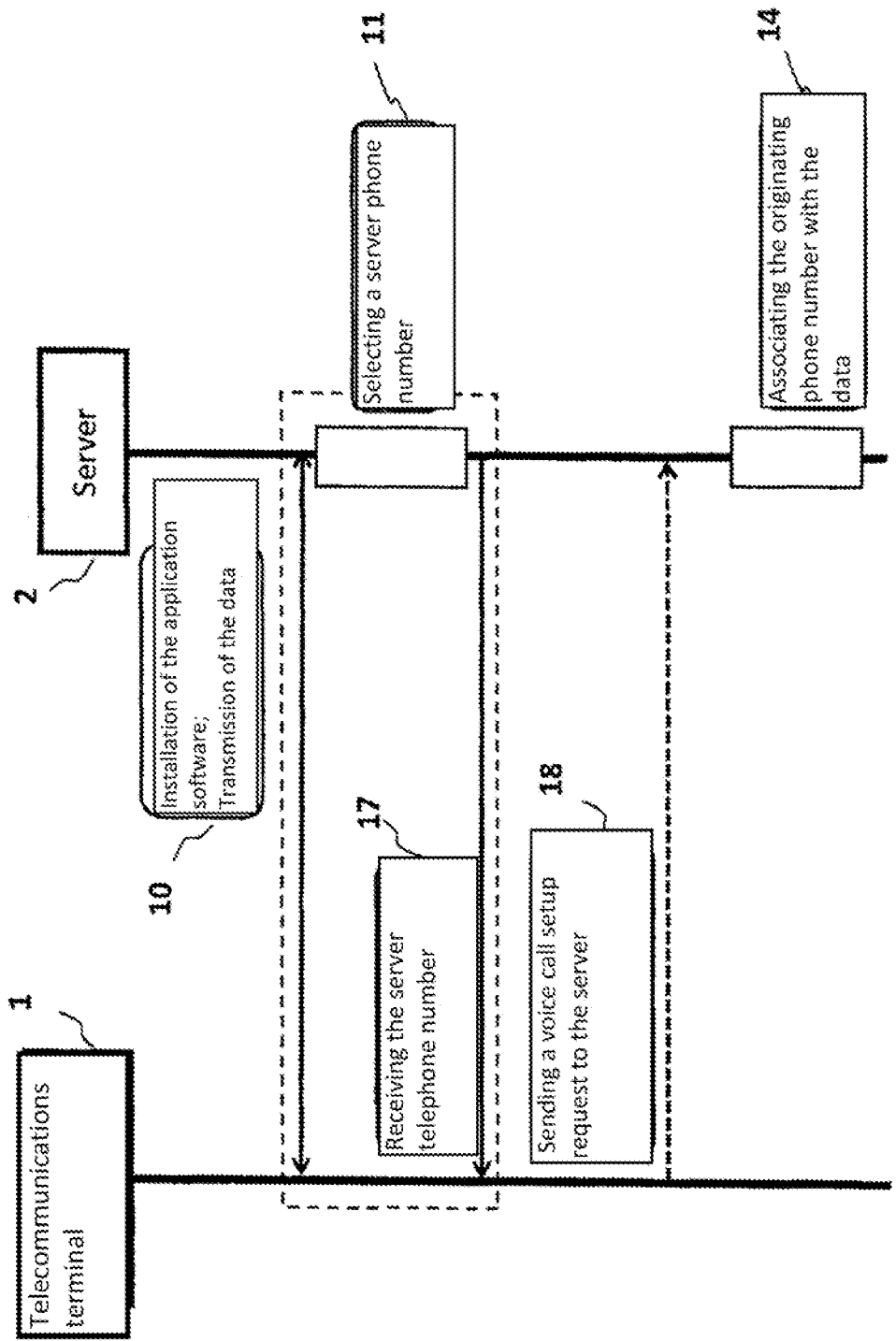
FIG. 10 shows a sequence diagram of the method according to the example in FIG. 2, however, from the perspective of the telecommunications terminal.

The previous sequence diagrams illustrate the method from the perspective of server 2. The sequence diagram of FIG. 10 now shows the basic example illustrated in FIG. 2 from the perspective of the telecommunications terminal 1. It includes, in an activity 17, receiving, by the telecommunications terminal 1, a server telephone number transmitted by server 2. Furthermore comprised in an activity 18 is the sending of a voice call setup request directed to the server telephone number by the telecommunications terminal 1, wherein the originating telephone number is transmitted with the voice call setup request and wherein call number transmission is enabled at least for sending the two voice call setup requests. Enabling the call number transmission for sending the two voice call setup requests is performed by the application software, and enables server 2 to determine the originating telephone number in the course of detecting the voice call setup request sent by telecommunications terminal 1 (activity 13 in FIGS. 2, 3, 4, 6, 7, and 8).

Figure 11:
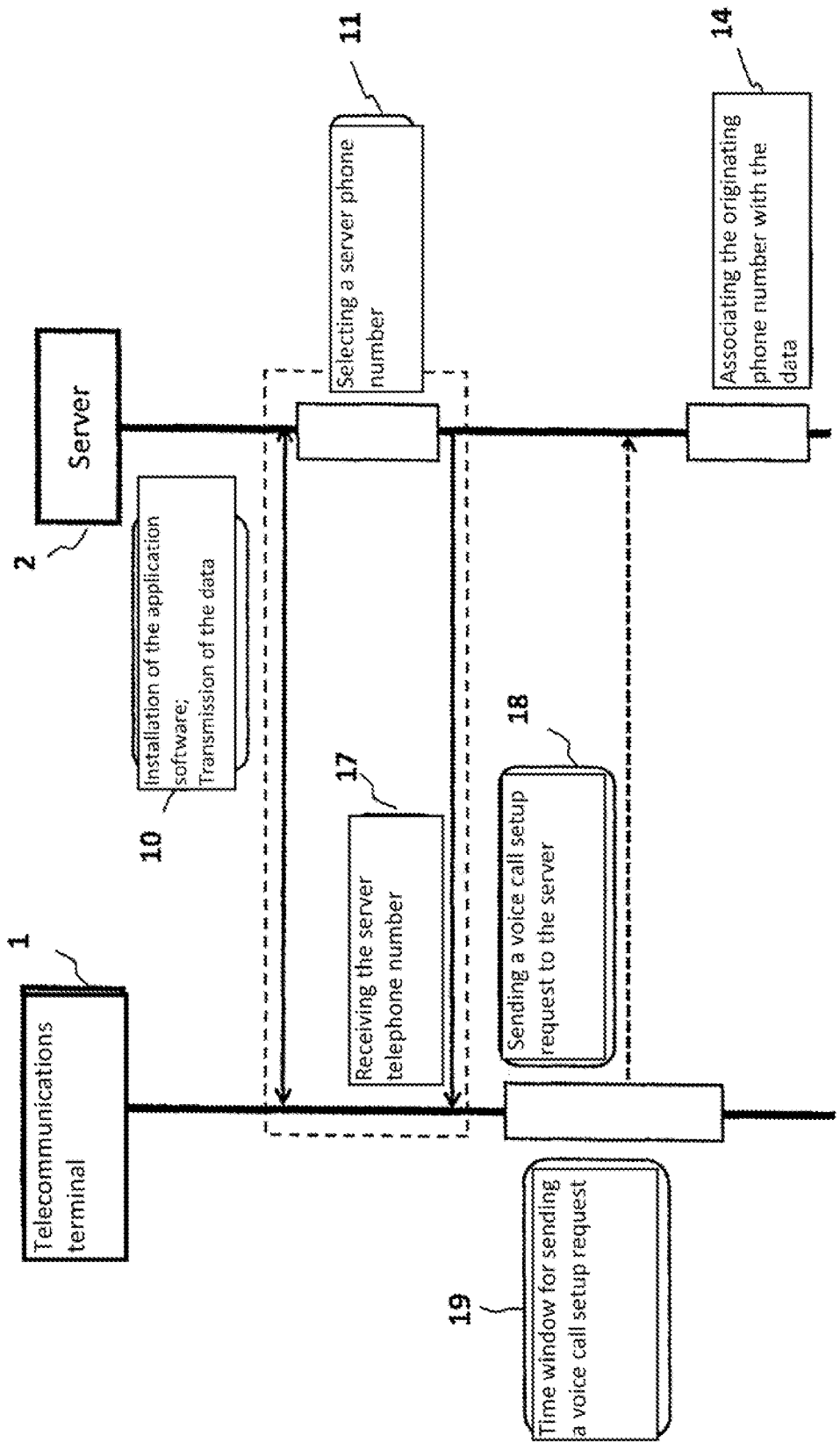
FIG. 11 shows a sequence diagram of the method according to the example in FIG. 3, again from the perspective of the telecommunications terminal.

FIG. 11 illustrates the variant of FIG. 4 from the perspective of the telecommunications terminal. It comprises the telecommunications terminal 1 sending, in the activity 18, a voice call setup request directed to a server telephone number, the sending of the voice call setup request within a time window 19 comprising a time from which the time window starts to run, transmitted from the server to the telecommunications terminal 1, and a duration for running the time window, transmitted from the server to the telecommunications terminal 1. For the determination of the time and duration of the time window, reference is made to the corresponding explanations in the above sections.

Figure 12:
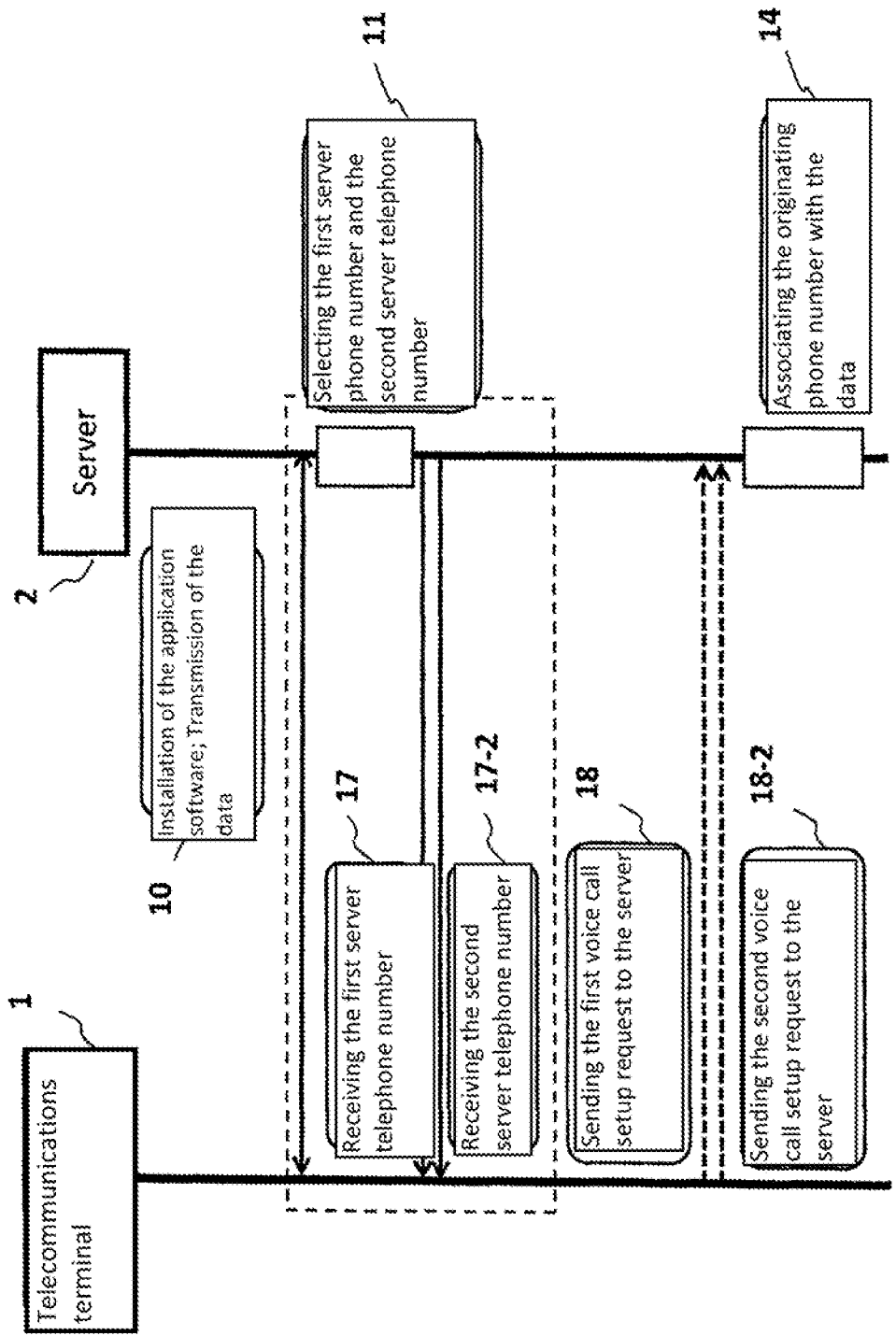
FIG. 12 shows an embodiment of the invention from the perspective of the telecommunications terminal similar to the example of FIG. 10 with a second server telephone number.
Figure 13:
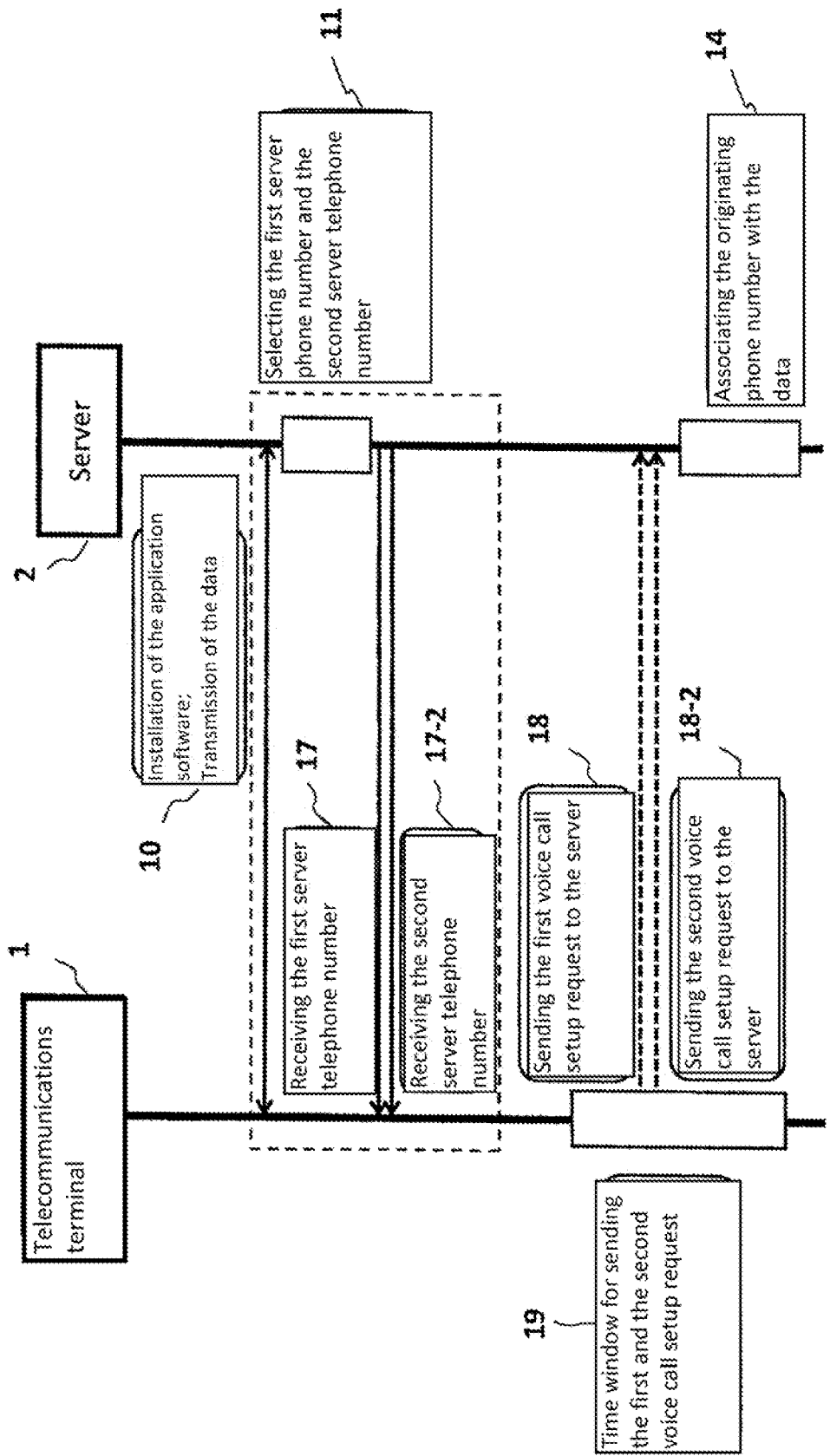
FIG. 13 shows an embodiment from the perspective of the telecommunications terminal according to FIG. 11 with a setting of the time window at the telecommunications terminal similar to the example of FIG. 8.

Accordingly, the terminal counterparts of the server side methods of FIG. 6 and FIG. 8 are also included in this description. Compared to FIGS. 10 and 11, these contain as an additional activity only that the telecommunications terminal sends a voice call setup request to each of the two different server telephone numbers, with which the latter informs the server 2 of its originating telephone number in each case. FIG. 12 illustrates the terminal-side reception of the second server telephone number in activity 17-2 and the terminal-side transmission of a voice call setup request directed to the second server telephone number in activity 18-2. Accordingly, FIG. 13 shows a variant similar to the example of FIG. 10 with a second server telephone number.

To ensure transmission of the originating telephone number, it is advantageous for the application software to enable telephone number transmission at the telecommunications terminal 1 at least for sending the two voice call setup requests.

A computer program, stored for example in a non-volatile memory in the telecommunications terminal 1, includes instructions for executing one or more of the described variants of the method for determining an originating telephone number of the telecommunications terminal 1 when executed on the telecommunications terminal 1. The method comprises reading a (first) server telephone number and, in embodiments with two call setup requests, a second server telephone number transmitted from a server, as well as sending the first voice call setup request directed to the (first) server telephone number and, if applicable, sending the second voice call setup request directed to the second server telephone number, wherein the first or the second originating telephone number, if any, is transmitted with the first or second voice call setup request, respectively, and wherein call number transmission is enabled. In one variant, the computer program ensures, for example, that the voice call setup request(s) is (are) made within a time window comprising a time from which the time window starts to run, transmitted from the server 2 to the telecommunications terminal 1, and a duration for the time window to run, transmitted from the server to the telecommunications terminal, or a time end point.

The invention claimed is:

1. A method for determining, by a server, an originating telephone number of a telecommunications terminal and associating it with at least one data transmitted to the server in the course of an installation of application software on the telecommunications terminal or linked with a download of the application software or included in the downloaded application software, comprising:
    selecting a server telephone number for the purpose of the association to be performed from a set of several possible server telephone numbers;
    transmitting the server telephone number to the telecommunications terminal via data communication, but not by way of a call to the telecommunications terminal, wherein the transmission occurs in the course of the installation of the application software on the telecommunications terminal or with the download of the application software;
    detecting a voice call setup request directed from the telecommunications terminal to the server telephone number, wherein the originating telephone number is transmitted with the voice call setup request;
    associating the originating telephone number transmitted with the voice call setup request with the at least one data;
    wherein, in the course of detecting the voice call setup request, no setup of a call is performed by the server.

2. The method according to claim 1, the method further comprising one of the following (a) and (b):
    (a) setting a time window by the server after transmitting the server telephone number to the telecommunications terminal within which the server is ready for detecting the voice call setup request directed by the telecommunications terminal to the server telephone number, and wherein setting the time window comprises setting a time from which the time window starts to run and setting a duration for running the time window, or a time end point,
    (b) setting a time window by the server after transmitting the server telephone number to the telecommunications terminal, within which the server is ready for detecting the voice call setup request directed by the telecommunications terminal to the server telephone number, and wherein setting the time window comprises setting a time from which the time window starts to run and setting a duration for running the time window, or a time end point, and transmitting the time and the duration or the time end point, respectively, to the telecommunications terminal, and the time end point or the time end point to the telecommunications terminal, wherein the transmission of the time and the duration or the time end point takes place in the course of the installation of the application software on the telecommunications terminal or with the download of the application software.

3. The method according to claim 1, wherein the method further comprises one of the following (a) and (b):
    (a) enabling the server to reselect the server telephone number after the time window has expired regardless of whether the transmitted originating telephone number has been associated with the at least one data,
    (b) enabling the server to reselect the server telephone number after the transmitted originating telephone number has been associated with the at least one data regardless of whether the time window has already expired.

4. The method according to claim 1, wherein the method is repeated in case of non-detection of the voice call setup request directed to the server telephone number, wherein the installation of the application software or the download of the application software is not repeated.

5. The method according to claim 1, the method further comprising:
    selecting a second server telephone number for the purpose of the association to be performed from a set of several possible server telephone numbers;
    transmitting the second server telephone number to the telecommunications terminal via data communication, but not by way of a call to the telecommunications terminal, wherein the transmission occurs in the course of the installation of the application software on the telecommunications terminal or with the download of the application software;
    detecting a voice call setup request directed from the telecommunications terminal to the second server telephone number, wherein the originating telephone number is transmitted with the voice call setup request;

associating the originating telephone number transmitted with the voice call setup request with the at least one data.

6. The method according to claim 5, the method further comprising one of the following (a) and (b):
   (a) setting a time window by the server after transmitting the server telephone number or the second server telephone number to the telecommunications terminal, within which the server is ready to detect the voice call setup request directed by the telecommunications terminal to the server telephone number and to the second server telephone number, and wherein setting the time window comprises setting a time from which the time window starts to run and setting a duration for running the time window, or a time end point,
   (b) setting a time window by the server after transmitting the server telephone number or the second server telephone number to the telecommunications terminal, within which the server is ready for detecting the voice call setup request directed by the telecommunications terminal to the server telephone number and to the second server telephone number, and wherein setting the time window comprises setting a time from which the time window starts to run and setting a duration for running the time window, or a time end point, and transmitting the time and the duration or the time end point to the telecommunications terminal, wherein transmitting the time and the duration or the time end point to the telecommunications terminal takes place in the course of the installation of the application software on the telecommunications terminal or with the download of the application software.

7. The method according to claim 5, wherein the method further comprises one of the following (a) and (b):
   (a) enabling the server to reselect the server telephone number and the second server telephone number after the time window has expired regardless of whether the transmitted originating telephone number has been associated with the at least one data,
   (b) enabling the server to reselect the server telephone number and the second server telephone number after the transmitted originating telephone number has been associated with the at least one data regardless of whether the time window has already expired.

8. The method according to claim 5, wherein the method is repeated in case of non-detection of the voice call setup request directed to the server telephone number and the voice call setup request directed to the second server telephone number, wherein the installation of the application software or the download of the application software is not repeated.

9. The method according to claim 5, wherein the method is preceded or followed by an additional method according to claims 1 to 4.

10. The method according to claim 1, further comprising at least one of the following (a) and (b):
    (a) comprising, by setting the time window, setting an additional duration within which the telecommunications terminal does not make a new voice call setup request to the server telephone number and/or the second server telephone number after the time window expires;
    (b) comprising, by the installation of the application software or the download of the application software by the telecommunications terminal, a data communication dialog with the server in which the telecommunications terminal transmits a user identification to the server, wherein the user identification is comprised of the at least one data, and wherein associating the originating telephone number with the at least one data comprises verifying the user identification.

11. A method for determining, by a server, an originating telephone number of a telecommunications terminal and associating it with at least one file transmitted to the server in the course of an installation of application software on the telecommunications terminal or linked with a download of the application software or included in the downloaded application software, comprising:
    selecting a first server telephone number for the purpose of the association to be performed from a set of several possible server telephone numbers;
    transmitting the first server telephone number to the telecommunications terminal via data communication, but not by way of a call to the telecommunications terminal, wherein the transmission occurs in the course of the installation of the application software on the telecommunications terminal or with the download of the application software;
    detecting a first voice call setup request directed from the telecommunications terminal to the server telephone number, wherein the originating telephone number is transmitted with the voice call setup request;
    selecting a second server telephone number for the purpose of the association to be performed from a set of several possible server telephone numbers;
    transmitting the second server telephone number to the telecommunications terminal via data communication, but not by way of a call to the telecommunications terminal, wherein the transmission occurs in the course of the installation of the application software on the telecommunications terminal or with the download of the application software;
    detecting a second voice call setup request directed from the telecommunications terminal to the server telephone number, wherein the originating telephone number is transmitted with the second call setup request;
    verifying that the originating telephone numbers transmitted with the two voice call setup requests are identical;
    if the verification is positive, associating the originating telephone number transmitted with the two voice call setup requests with the at least one data,
    wherein, in the course of detecting the voice call setup requests, no setup of a call is performed by the server.

12. The method according to claim 11, the method further comprising one of the following (a) and (b):
    (a) setting a time window by the server after transmitting the first server telephone number or the second server telephone number to the telecommunications terminal, within which the server is ready to detect the voice call setup request directed by the telecommunications terminal to the first server telephone number and to the second server telephone number, and wherein setting the time window comprises setting a time from which the time window starts to run and setting a duration for running the time window, or a time end point,
    (b) setting a time window by the server after transmitting the first server telephone number or the second server telephone number to the telecommunications terminal, within which the server is ready for detecting the voice call setup request directed by the telecommunications terminal to the first server telephone number and to the second server telephone number, and wherein setting the time window comprises setting a time from which the time window starts to run and setting a duration for running the time window, or a time end point, and transmitting the time and the duration or the time end point to the telecommunications terminal, wherein transmitting the time and the duration or the time end point to the telecommunications terminal takes place in the course of the installation of the application software on the telecommunications terminal or with the download of the application software.

13. The method according to claim 11, wherein the method further comprises one of the following (a) and (b):
   (a) enabling the server to reselect the first server telephone number and the second server telephone number after the time window has expired regardless of whether the transmitted originating telephone number has been associated with the at least one data,
   (b) enabling the server to reselect the first server telephone number and the second server telephone number after the transmitted originating telephone number has been associated with the at least one data regardless of whether the time window has already expired.

14. The method according to claim 11, wherein the method is repeated in case of non-detection of the voice call setup request directed to the first server telephone number and the voice call setup request directed to the second server telephone number, wherein the installation of the application software or the download of the application software is not repeated.

15. The method according to claim 11, further comprising at least one of the following (a) and (b):
   (a) comprising, by setting the time window, setting an additional duration within which the telecommunications terminal does not make a new voice call setup request to the first server telephone number and/or the second server telephone number after the time window expires;
   (b) comprising, by the installation of the application software or the download of the application software by the telecommunications terminal, a data communication dialog with the server in which the telecommunications terminal transmits a user identification to the server, wherein the user identification is comprised of the at least one data, and wherein associating the originating telephone number with the at least one data comprises verifying the user identification.

16. A method for transmitting an originating telephone number of a telecommunications terminal to a server by the telecommunications terminal, comprising:
   receiving a server telephone number transmitted from a server; and
   sending a voice call setup request directed to the server telephone number, wherein the originating telephone number is transmitted with the voice call setup request and wherein call number transmission is enabled,
   wherein sending the voice call setup request or voice call setup requests, respectively, directed to the server telephone number or server telephone numbers, respectively, comprises sending the voice call setup request or voice call setup requests, respectively, within a time window, wherein the time window comprises a time point communicated from the server to the telecommunications terminal from which the time window begins to run and a duration transmitted from the server to the telecommunications terminal for the time window to run, or a time end point.

17. A computer program product comprising instructions stored on a computer-readable storage medium for executing a method for determining an originating telephone number of a telecommunications terminal when the computer program is executed on the telecommunications terminal, comprising:
   reading a server telephone number transmitted from a server; and
   sending a voice call setup request directed to the server telephone number, wherein the originating telephone number is transmitted with the voice call setup request and wherein call number transmission is enabled,
   wherein, in the method performed by the computer program, sending the voice call setup request or voice call setup requests directed to the server telephone number or server telephone numbers comprises sending the voice call setup request or voice call setup requests within a time window, the time window comprising a time communicated by the server to the telecommunications terminal from which the time window begins to run and a duration transmitted by the server to the telecommunications terminal for the time window to run.

* * * * *